Dec. 15, 1931.  W. B. HUTHER  1,836,120
DEVICE FOR SHARPENING, FILING, OR DRESSING THE TEETH OF CIRCULAR SAWS
Filed Jan. 5, 1927  2 Sheets-Sheet 2
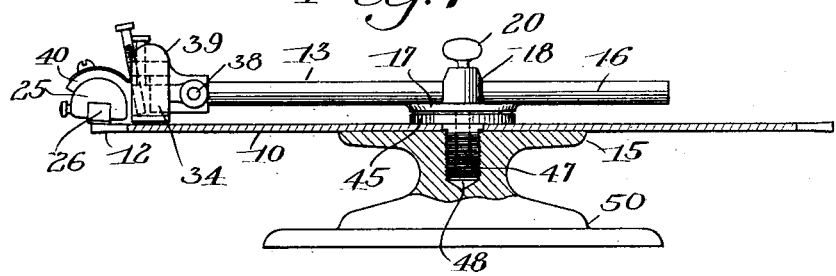
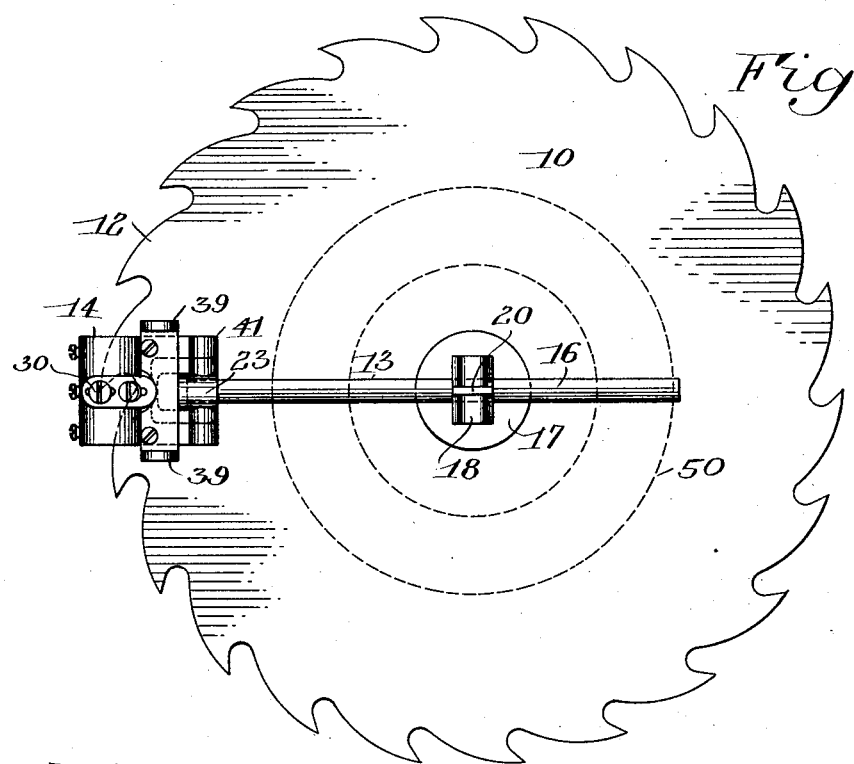
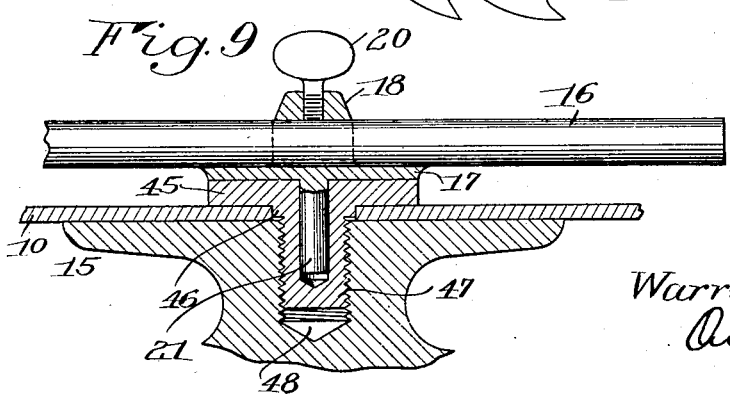
INVENTOR
Warren B. Huther
BY
his ATTORNEYS Patented Dec. 15, 1931

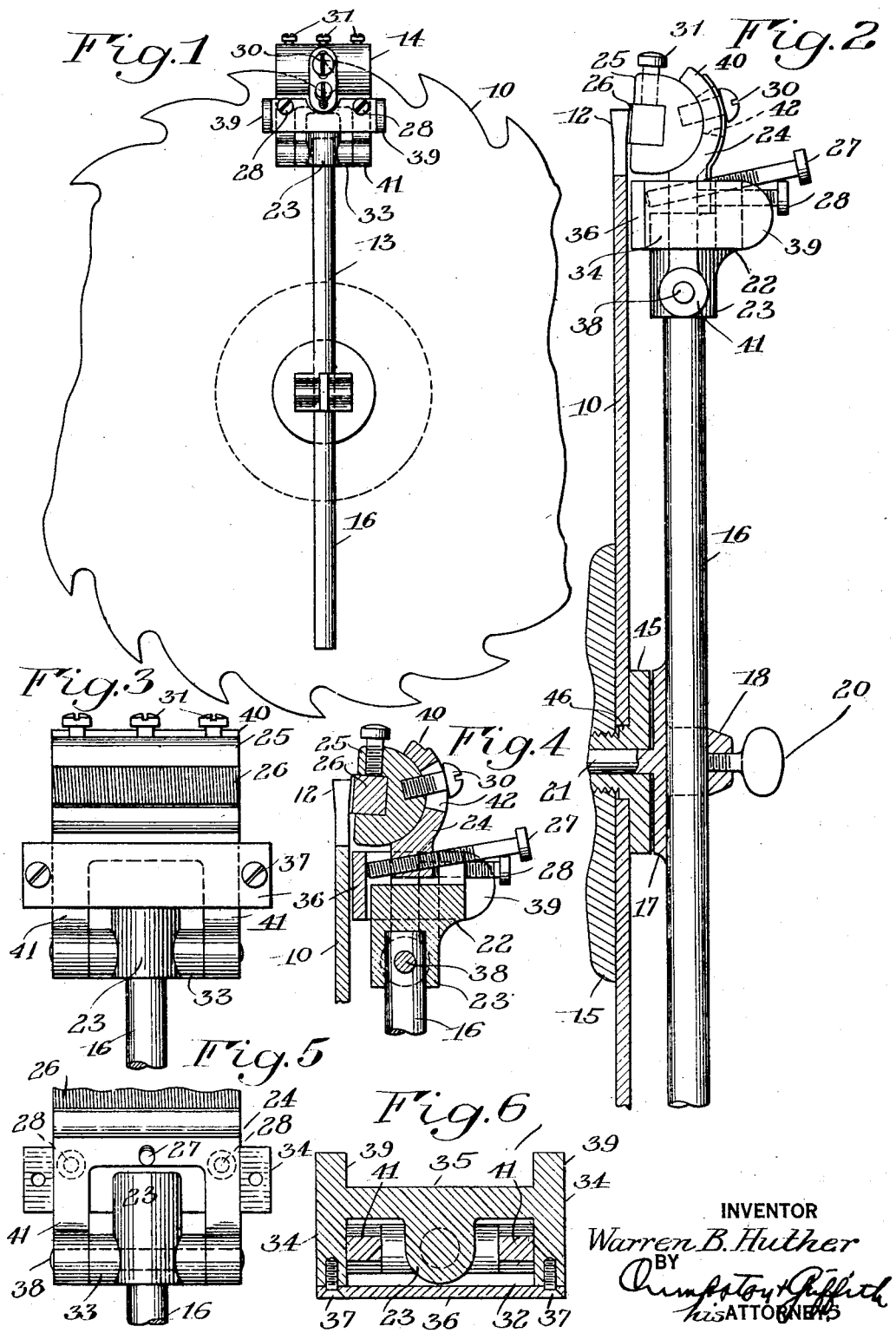

1,836,120

UNITED STATES PATENT OFFICE

WARREN B. HUTHER, OF ROCHESTER, NEW YORK, ASSIGNOR TO HUTHER BROS. SAW MFG. CO., OF ROCHESTER, NEW YORK, A CORPORATION OF NEW YORK

DEVICE FOR SHARPENING, FILING, OR DRESSING THE TEETH OF CIRCULAR SAWS

Application filed January 5, 1927. Serial No. 159,054.

This invention relates to an improved device for sharpening, filing or dressing the teeth of circular saws.

As a result of the usual swaging operation in connection with the sharpening of saws, the ends of the teeth are usually all of varying widths and have jagged edges. A saw at such stage of its sharpening cannot be efficiently used, as the burden of cutting the groove would be thrown entirely upon the widest tooth or upon the two teeth which extend outwardly the greatest distance on either side, which condition would result in burning or breaking of the tooth or teeth carrying the burden. According to some present practices the dressing of the teeth after swaging is sometimes done by hand filing each tooth individually. Hand filing is a slow and tedious process and consequently expensive. It is also obviously inaccurate and a thoroughly uniform width cannot be obtained for all of the teeth. Various devices designed to eliminate hand filing have been proposed, but they for the most part have been complicated in construction, expensive to manufacture, and generally unwieldy and inflexible in use.

The prime object of this invention is to provide a device of the above nature which is thoroughly efficient and dependable in operation.

Another object is to provide a device which is simple and inexpensive to manufacture.

Another object is to provide a device in which the parts are easily replaceable.

Another object is to provide a device in which parts may be readily substituted or adjusted to permit its use on saws of various sizes.

Another object is to provide a device in which the tool may be adjusted to permit dressing of the teeth to different angles on different saws.

Another object is to provide a device which becomes inoperative immediately upon completion of filing or dressing to the proper angle.

Other objects will be in part obvious or in part pointed out hereinafter.

The invention accordingly consists in the features of construction, combinations of elements, and arrangements of parts as will be exemplified in the structure hereinafter described and the scope of the application will be indicated in the following claims.

In the accompanying drawings in which is shown one of the possible embodiments of this invention, Figure 1 shows a front elevation of the device applied to a saw;

Figure 2 shows a side elevation, partly in section;

Figure 3 shows a rear elevation of the upper, or head portion of the device;

Figure 4 shows a sectional elevation of the head member as applied to a saw tooth when in use;

Figure 5 is a rear elevation of a portion of the head member with bearing plate 36 removed;

Figure 6 shows a sectional plan view of the head member;

Figure 7 shows a side view of the device, partly in section, with a saw held in position to be dressed;

Figure 8 shows a plan view of the arrangement shown in Figure 7; and

Figure 9 shows a sectional elevation of the hub or supporting member.

Similar reference characters refer to similar parts throughout the several views of the drawings.

Referring now to the drawings in detail, 10 indicates generally the saw being dressed, 12 indicates a type of tooth which it is proposed to dress with my device, and 13 indicates generally my device.

The device comprises a head, or tooth dressing member 14, a hub, or supporting member 15 and lever arm 16.

The hub member 15 comprises a plate or disc 17 having on one side or face a projection 18 having a bore, or slot, extending completely therethrough and having a screw member 20 adapted to project transversely into said slot and bear upon lever arm 16 mounted therein. The opposite side or face is provided with a projecting pin member 21 of substantially circular cross-section, adapted to fit within a circular slot or bore in the clamping member 45. The member 45 is provided with a smooth upper surface adapted for contact with the smooth lower surface of the member 17. The lower face of member 45 is provided with a projecting shoulder portion 46 and a threaded member 47. The shoulder portion 46 is preferably circular in cross-section and is adapted to fit within the arbor of the saw to be dressed. The threaded member 47 is adapted to be screwed into a threaded slot or bore 48 in the base member 50. The upper surface of the base member 50 is preferably of relatively large area to provide a substantial support for the saw. The surfaces of the member 47 and the slot 48 may be smooth and of any desired cross-sectional outline, although the threaded construction is preferred.

The lever arm 16 as shown is of substantially circular cross-section and it is provided at one end with a transversely extending slot or bore.

The head member 14 comprises a rectangular yoke 22, of which a cross-sectional plan is shown in Figure 6, a hub 23, a tool holder 24, a tool carrier 25, a tool 26, an adjusting screw 27, and set screws 28, 30, and 31.

The yoke is provided with a transverse slot as indicated at 32 (Fig. 6), and the hub 23 is attached to the front wall of the yoke substantially centrally of said slot. The hub 23 is provided with a slot or bore for the reception of an end of the lever arm 16, and has attached thereto at opposite sides the trunnions or lugs 33, the outer ends of which are smooth to provide bearing surfaces. The lugs or trunnions are provided with a slot or bore extending completely therethrough substantially centrally thereof and intersecting the slot or bore of the hub 23.

The yoke 22 comprises a channel-shaped member having side walls 34 and a wall 35 forming the front wall of the yoke. A plate 36 extends between the side walls of the channel and is releasably attached thereto, by means of screws 37. The plate 36 forms the rear wall of the yoke. The outer side of the plate 36 is smooth to provide a bearing surface. In the modification shown the side walls 34 have projecting lugs 39 to provide additional surface for hand gripping.

A pin 38 extends through the slots in the trunnions, hub and lever arm and projects beyond the outer ends of the trunnions, as is clearly shown in Figure 5.

The tool holder 24 comprises a guide portion 40, which is substantially semi-cylindrical in form, or, substantially semi-circular in cross-sectional outline, having attached thereto leg members 41. The outer ends of the said leg members are slotted or bored and the inner faces of the said ends are smooth to provide bearing surfaces. The tool holder extends through the slot in the yoke with the semi-cylindrical portion 40 extending substantially entirely above the said yoke, and with the concave surface thereof facing the rear wall of the yoke and having mounted thereon the tool carrier 25. The slotted ends of the leg members are pivotally mounted on the projecting ends of the pin 38. The portion 40 of the tool holder is provided with an arcuate slot indicated by the numeral 42 in Figure 4.

The tool carrier 25 is substantially semi-cylindrical in form and is provided on its flat surface with a groove for the reception of a tool 26, which in this instance is a square file, on its curved surface adjacent the flat surface with set screws 31 having communication with the said groove and contact with the tool therein, and on its curved surface, substantially centrally thereof, with an adjusting, or set screw 30 which extends through the groove 42 in the tool holder and has its head portion contacting with the outer surface of the portion 40 of the tool holder. The concave surface of the tool holder and the convex surface of the tool carrier are of the same curvature.

Adjusting screw 27 is mounted on the tool holder 24 with its head clear of the yoke and the other end bearing upon the inner face of the plate 36 which forms the rear wall of the yoke.

Set screws 28 are mounted on the front wall of the yoke with their head ends projecting outwardly and their other ends projecting inwardly and bearing upon the intermediate portion of the tool holder.

The device is preferably of metal construction although certain portions may be of wooden construction.

The perpendicular distances of the planes of the bearing surface of the yoke and the lower surface of the member 45 from the axis of the lever arm are preferably equal, whereby the lever arm may be so adjusted that the two surfaces lie in the same plane when the members 45 and 17 are in contact.

When a saw is to be dressed it is placed on the base or support 50 with its arbor opening coinciding with the slot 48, and a clamping member 45 having a shoulder 46 of proper thickness and cross-section to fit the arbor opening is screwed into the slot 48 and the saw is thereby centered and locked in position.

The screws 20, 27, 28 and 30 are then loosened and the device applied to the upper surface of the saw held in a horizontal position with the pin 21 projecting into the slot in the member 45 and the bearing surface of the yoke lying fully in contact with the upper face of the saw. The proper length of lever arm is then obtained by sliding the lever arm 16 the required amount and locking in position by means of the screw 20. The tool and tool carrier are next adjusted to the proper tooth angle by swinging the tool carrier in the holder and locking in position by means of the screw 30, allowance being made for a slight changing of the angle from the next following setting which is for the purpose of providing for the elimination of the burrs or rough edges of the teeth caused by the swaging. The bearing surface of the yoke is then moved away from the face of the saw a distance equal to the depth to be cut by the tool by operating the screws 27 and 28 in conjunction with each other and exerting an upward pressure on the lever arm to separate the members 17 and 45 slightly. The lever arm may be sufficiently flexible to permit the yoke to be moved away from the surface of the saw without moving the surfaces of members 45 and 17 out of contact.

The setting operations having been completed the device is operated by gripping the yoke, applying a proper amount of pressure and rotating the device about the pin 21 as an axis. When the proper depth of cut has been made the bearing face of the yoke comes into contact with the face of the saw and the lower surface of the member 17 comes into contact with the upper surface of member 45 and further cutting is impossible.

From the foregoing it will be seen that there is herein provided, in the embodiment shown, a device which embodies the features of this invention, and achieves the objects thereof. An improved saw dressing device is provided which is dependable in use and by means of which the saw teeth are thoroughly and accurately dressed for the purposes and in the manner first above pointed out.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim as my invention:

1. A saw dressing device comprising a hub member, a lever arm, and a head member; said hub member being provided with an opening for the reception of said lever arm and means for locking said hub in position on said lever arm; said lever arm being circular in cross-section and being provided with an opening adjacent one end; said head member comprising a yoke provided with an aperture, a hub member attached to said yoke substantially centrally of said aperture and being provided with an opening for the reception of an end of the lever arm, said hub being further provided with lugs on opposite sides thereof, said lugs having bearing surfaces on their outer ends, an opening extending substantially centrally through said lugs and intersecting the lever arm opening in the hub, a pin member extending through the openings in the lugs and the opening in the lever arm and having its ends projecting beyond the ends of the lugs, a tool holder pivotally mounted on the ends of said pin and extending through the yoke aperture, means mounted on said tool holder and contacting with a side of said yoke for adjusting the tool holder, means mounted on the opposite side of said yoke for locking said tool holder in adjusted position, said tool holder being provided at one end with an arcuate groove and an arcuate slot, a substantially semi-cylindrical tool carrier mounted in said groove and adjustably attached to said tool holder by means passing through said arcuate slot.

2. In a saw dressing device a lever arm, a tooth dressing member comprising a yoke and a tool holder, said yoke having a bearing surface secured thereto, a single means for rigid attachment of said yoke and lever arm to each other and pivotal attachment of said tool holder thereto, and means associated with said yoke for adjusting and holding said tool holder in predetermined position relative to said arm and said bearing surface.

3. In a saw dressing device, a head member comprising a substantially rectangular yoke provided with a transversely extending aperture, a hub member attached to said yoke and provided with a longitudinally extending opening, a pin member mounted within said hub opening and having its ends projecting beyond the sides of said hub, a tool holder pivotally mounted on said pin and extending through the aperture in said yoke, means for angularly adjusting said tool holder relatively to said yoke, means for locking said tool holder in its adjusted position and a tool adjustably attached to said tool holder.

4. In a saw dressing device, a yoke comprising a substantially channel-shaped member having a plate extending between and removably attached to the sides of the channel, said plate having its outer side smooth to provide a bearing surface, and a hub member attached to the channel-shaped member substantially centrally thereof, said hub being provided with an opening extending in the direction of the channel for the reception of a lever arm and a transversely extending opening extending completely therethrough and intersecting said lever arm receiving slot.

5. In a saw dressing device, a tool holder comprising a substantially semi-circular member provided with an arcuate slot, leg members attached to said semi-circular member and provided at their ends with transversely extending openings, a channel-shaped member within said semi-circular member and adjustably attached thereto by means extending through the slot in the semi-circular member, the curvatures of the outer surface of the channel-shaped member and the inner surface of the semi-circular member being substantially the same to permit relative movement therebetween.

6. In a saw dressing device, a radial member, a tool holder pivotally secured to said member and provided with a groove and an arcuate slot, a channel-shaped member seated in said groove and adjustably attached to said tool holder by means extending through said arcuate slot, a saw dressing tool removably seated within said channel-shaped member, and means associated with said radial member for varying the angular relation of said tool holder relative to said radial member, the contacting surfaces of the tool holder and the channel-shaped member being of substantially the same curvature to permit relative movement, said tool holder and channel shaped member extending substantially the full length of said tool.

7. A device for dressing circular saws comprising, in combination, a substantially radial member having a yoke secured thereto, a saw bearing surface detachably secured to said yoke, a tool holder mounted on said member for pivotal movement relative thereto independently of said bearing surface, means associated with said yoke for securing said tool holder in predetermined relation to said radial member and said bearing surface, a tool carrier mounted on said tool holder for angular adjustment relative thereto, and a saw dressing tool carried by said tool carrier for engaging the sides of the teeth on said saw.

8. In a saw dressing device, including a radially extending arm, for use with a circular saw having an arbor opening centrally thereof, the combination with a support for said saw, of a locking member adjacent said arbor opening for centering and locking said saw on said support, and a portion pivotally mounted on said member for engaging said arm, said portion being provided with guide means for holding said radially extending arm in adjusted position and being removable independently of said saw locking member.

9. In a saw dressing device for use with a circular saw having an arbor opening centrally thereof, the combination with a support for said saw, said support having a depression therein and a portion contacting with one face of said saw, of a locking member contacting with the face of the saw opposite to that in contact with the support and having a portion thereof extending through the saw arbor opening and into said depression for centering and locking said saw to said support, said locking member having a cavity concentric with said saw, a saw dressing tool, and means including a pin extending into said cavity and rotatable therein for securing said saw dressing tool to said support for rotation concentrically with relation to said saw.

10. In a saw dressing device for use with a circular saw having an arbor opening centrally thereof, the combination with a support for said saw, said support having a depression therein and a portion contacting with one face of said saw, of a locking member contacting with the face of the saw opposite to that in contact with the support and having a portion thereof extending through the saw arbor and into said depression for centering and locking said saw to said support, said locking member having a cavity concentric with said saw, a saw dressing tool including an arm extending substantially radially of said saw, and means for connecting said arm to said support, said means comprising a pin extending into said cavity and rotatable therein so that said dressing tool may be swung circumferentially around said saw and concentrically therewith by rotating said pin in said cavity, said means also comprising a guide in which said arm is longitudinally slidable and mechanism associated with said guide for holding said arm in adjusted position.

WARREN B. HUTHER.